March 4, 1969   A. W. NELSON   3,430,789
TOW BAR ARRESTING DEVICE
Filed March 16, 1967
FIG. 1
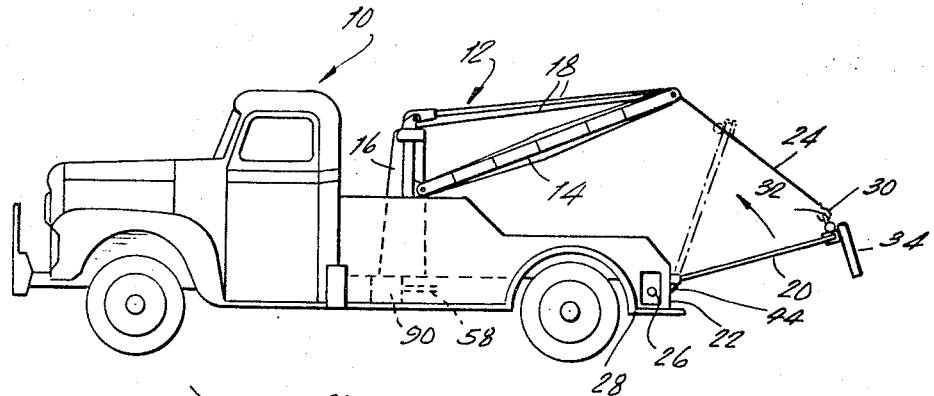
FIG. 3
FIG. 2
FIG. 4
FIG. 5
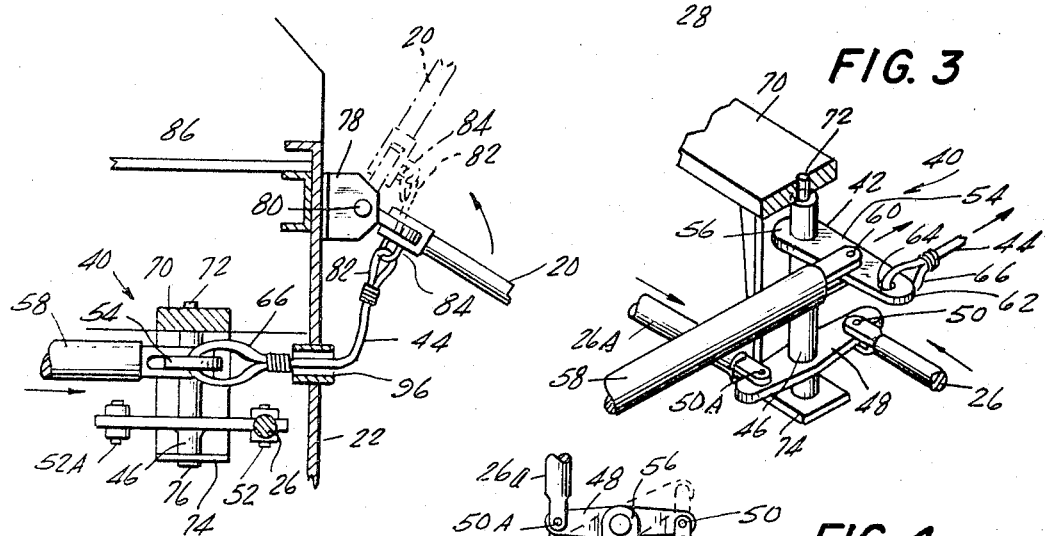
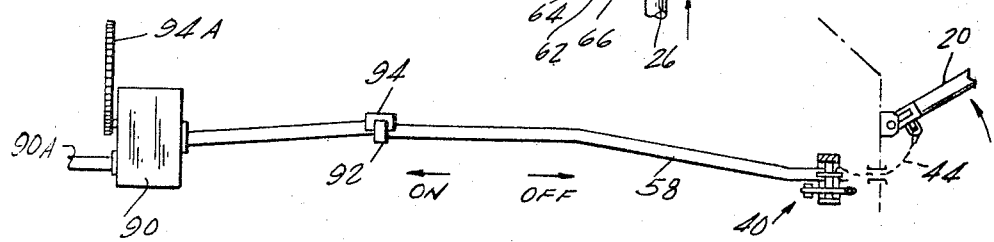
INVENTOR.
ARTHUR W. NELSON
BY
Friedman & Goodman
ATTORNEYS United States Patent Office 3,430,789
Patented Mar. 4, 1969

3,430,789
TOW BAR ARRESTING DEVICE
Arthur W. Nelson, 276 Long Island Ave.,
Wyandanch, N.Y. 11798
Filed Mar. 16, 1967, Ser. No. 623,689
U.S. Cl. 214—86
Int. Cl. B66c 21/02, 13/48
5 Claims

ABSTRACT OF THE DISCLOSURE

This invention is concerned with providing a means for arresting the upward motion of a pivotally mounted tow bar on an auto wrecker, when said tow bar has reached its maximum vertical displacement with relation to an automobile or truck being raised by said tow bar. Briefly, the invention provides a means for arresting the upward motion of the tow bar by automatic disengagement of the tow bar from the power take-off unit to which it is connected by means of a winch driven cable, said winch cable acting to raise the tow bar.

Background of the invention

*Field of the invention.*—This invention relates generally to a tow bar arresting device on an auto wrecker. More particularly, this invention relates to a tow bar arresting device which will automatically stop the upward motion of a tow bar which has raised the vehicle to be towed to the maximum height capable for the tow bar.

*Description of the prior art.*—Tow bars on auto wreckers (hereinafter referred to as wreckers) for raising the front or rear ends of vehicles to be towed for one reason or another, such as disablement of the engine, or a collision, or the like, are well known. Generally, the disabled auto or truck is elevated by means of the tow bar which is in turn connected to a winch drive mechanism, the tow bar usually being connected by means of a chain hook, or the like, to a bumper of the disabled vehicle.

It has been a problem, however, in conventional tow bars that when the vehicle has been raised to the upper vertical limit of the tow bar, that the winch drive mechanism continues to operate. If the winch drive mechanism is not shut off if it continues to pull up on the tow bar beyond the limit of its pivotal movement by means of the winch cable connected to the same, with the result that the winch cross arms are caused to buckle or the back plate of the wrecker, to which the tow bar is connected, is wrenched outwardly. Either way, the efficacy of the tow bar unit is seriously impaired. While manual cut-off controls for the tow bar unit are generally located at the right and left rear sides of the wrecker these are generally unsatisfactory, since if the drive mechanism is operated from inside of the wrecker, the operator's vision is obscured and he must get out of the cab in order to see how high the disabled vehicle has been raised, and then use the manual cut-off control. Alternatively, if the operator can run the drive mechanism from outside the truck, if his attention is distracted, or he leaves the wrecker unattended for some reason, again damage will result to the winch cross arms and/or the back plate.

Summary of the invention

It is, therefore, among one of the principal objectives of the invention to provide a means for automatically arresting the upward motion of a tow bar engaged in the elevation of a vehicle for subsequent towing by a wrecker to which the tow bar is connected.

In accordance with the present invention a tow bar arresting device has been devised which provides for automatically disengaging the tow bar from the power take-off unit. The inventive tow bar arresting device comprises a power link assembly in combination with arresting means, said arresting means being connected to the tow bar, the automatic actuation of said arresting means by vertical displacement of said tow bar resulting in disengagement of said tow bar from a power take-off unit to which said power link assembly is connected, said tow bar being in turn connected to said power take-off unit by means of a winch driven cable, which cable acts to raise the said tow bar.

Brief description of the drawing

The invention will be hereinafter more fully described with reference to the accompanying drawing, in which:

FIGURE 1 is a side elevational view of an auto wrecker showing the relative positions of the tow bar, winch cross arm and winch cable, with the tow bar shown by phantom lines in a generally vertically displaced position, in the direction of the arrow over the lowered tow bar position. Another winch cross arm in V-shaped relation to the one visible is not visible from this view;

FIGURE 2 is a side view, partially in cross-section, of the invention, showing the tow bar arresting device in relation to the tow bar, which is shown in a lowered position, and in a generally raised position by phantom lines, in the direction of the arrow;

FIGURE 3 is a view in perspective of the device in the unactuated position;

FIGURE 4 is a top view of the device with the actuated position, i.e., tow bar disengaged, shown by dotted lines; and FIGURE 5 is a side view of the power drive mechanism, with the body of the wrecker removed, and showing the device partially in cross-section and in relation to the power take-off unit, tow bar, and winch drive mechanism.

Description of the preferred embodiments

Referring now to the figures of the drawing, for purposes of illustration FIG. 1 depicts an auto wrecker 10, a winch assembly 12 located in the rear portion of said wrecker, a winch cross arm 14 (a cross arm may also extend on the other side not shown) extending from the rear vertical portion 16 of said winch assembly 12, and winch cables 18. It will be noted that rear vertical portion 16, winch cables 18 and winch cross arms 14 form a triangle, of which said cross arm 14 forms the longest side. A tow bar 20 is pivotally attached to the back plate 22 of said wrecker 10, and said tow bar is elevated in the direction of the arrow by means of winch cable 24 connected to a suitable winch drive (not shown in FIG. 1). Left manual cut-off control 26 is shown between the back plate 22 and fender skirt 28. The winch cable 24 is connected to tow bar 20 by means of a hook 30 through ring 32 which is integrally joined to tow bar 20. As can be seen by the phantom lines showing the said tow bar at its maximally elevated position, when a disabled vehicle (not shown) is hooked up to read plate 34 of tow bar 20, if the winch drive mechanism is not timely disengaged from the power unit the said winch cross arm 14 will buckle because of the extreme stress caused by the tension on the cable when the tow bar has reached the limit of its movement. Alternatively, and sometimes, or both, the back plate 22 will be pulled away from the wrecker chassis by the action of the winch cable 24 continuing to pull up on the tow bar 20 as in the prior art tow bar units. These aforementioned prior art damages are prevented by the invention tow bar arresting device.

The tow bar arresting, generally shown by the numeral 40, comprises a shift control linkage assembly 42 in combination with an arresting cable 44, as can be seen by referring to FIGS. 2 and 3. The said shift control linkage assembly 42, made of steel or other suitable metal, comprises a vertical shift link shaft 46, a left manual cut-off control 26 and right manual cut-off control 26A, both of said cut-off controls being oppositely secured to control bar 48 at points 50 and 50A by means of rivets or bolts 52 and 52A through the appropriate registered orifices (not shown), and an arresting bar 54. Control bar 48 and arresting bar 54 are integrally joined to vertical shift link shaft 46, with said shift link shaft running approximately through the center of generally elliptically-shaped control bar 48 and through a semicircular end 56 of arresting bar 54. Centrally connected to arresting bar 54 is a shift control shaft 58 by means of a rivet or bolt 60 through the appropriate registered orifices (not shown). Connected to the opposing semicircular end 62 of arresting bar 54, through orifice 64, is the arresting cable 44, by means of closed loop 66. Arresting cable 44 is made of suitable material such as maleable steel wire, or the like. The semicircular ends 56 and 62 of arresting bar 54 are shown having tapering sides joining them, that is tapering from 56 to 62; however these sides may be parallel to one another. The vertical shift link shaft 46 is pivotally mounted in mounting bar 70 by means of pivot 72 and in power link bracket 74 by means of pivot 76. In FIG. 2, tow bar 20 can be seen pivotally mounted to bracket 78 (which is secured to back plate 22) by means of pivot 80 which is preferably a bolt properly secured. Arresting cable 44 passing through sleeve 96 is connected to tow bar 20 at its lower end, i.e., at its pivotal end, by means of another closed loop 82 through ring 84 integrally joined to the lower end of said tow bar. The deck of the wrecker is identified by the numeral 86.

Referring now to FIG. 5, the power assembly for elevating tow bar 20 can be seen. The shift control linkage assembly 42 with shift control shaft 58 connected thereto is shown. The said shift control shaft is conventionally connected to the power take-off unit 90 for horizontal reciprocal movement. About two-thirds of the way up the said power shaft is located a sleeve 92 and its attendant support bracket 94. In conjunction therewith is shown winch drive 94A which is operatively engaged and disengaged from the power take-off unit 90, by the horizontal shifting movement of shift control shaft 58. As indicated above, the power take-off unit is conventionally connected to supply the power to winch drive 94A and thus elevate tow bar 20 by means of winch cable 25. The on and off positions of the power drive connection to the winch drive 94A are indicated by the arrows in FIG. 5, and as shown the drive is in the "on" position.

The operation of the tow bar arresting device will be seen especially by reference to FIGS. 1–4. When the tow bar 20 is elevated to its predetermined maximal vertical height in the direction of the arrow over the tow bar by means of the power driven winch cable 24, the arresting cable 44 is caused to be pulled through sleeve 96 by means of loop 82 connected to ring 84 which in turn causes loop 66 to pull against arresting bar 54 by means of loop 66 through orifice 64, thereby displacing the said arresting bar outwardly by the pivotal action of pivots 72 and 76, in the direction of the arrow in FIG. 3 leading from the arresting cable 44. By virtue of this outward displacement of said arresting bar 54, the movement of the tow bar is arrested, that is to say the winch drive 94A is disengaged from the said power take-off unit, the said winch drive otherwise causing winch cable 24 to continue hoisting the tow bar 20, as previously described. Again referring to FIG. 3, when the arresting cable 44 pulls arresting bar 54 outwardly in the direction of the arrow leading from said arresting cable this causes the other parts to move in conjunction therewith in the direction of the arrows closest to them, i.e., cut-off controls 26 and 26A (on control bar 48) and shift control shaft 58. FIG. 4 shows these said parts in FIG. 3 in related displacement, and serves to further explain the operation of the device. It will be evident from FIGS. 3 and 4 that said arresting cable 44 causes the manual cut-off controls 26 and 26A to move with the entire shift control linkage assembly 42. However, the manual cut-off controls 26 and 26A can be still manually operated by the operator whenever the situation arises. As mentioned hereinabove, arresting bar 54, vertical shift link shaft 46 and control bar 48 are all integrally joined and pivotal motion is permitted to said vertical link shaft by pivots 72 and 76 in mounting bar 70 and power link bracket 74, respectively.

With regard to the applicability of the subject tow bar arresting device it can be adapted to any of the conventional auto wreckers. For example, it can be adapted to a V-shaped tow bar with either a rectangular rear plate, or a rear pipe stanchion. It can be adapted to a T-shaped tow bar as well. Moreover, if a V-shaped tow bar is used, there in only a single arresting device required, located at one end only of the V, i.e., at the base of either leg of the V.

It is of course understood that the arresting cable 44 should be long enough to lay freely between the tow bar 20 and arresting bar 54, yet be short enough so that when the tow bar is raised to its predetermined maximum vertical height and before excessive tension is placed thereon it will cause the displacement of the arresting bar 54 a distance sufficient to disengage the winch drive from the power take-off unit, thereby stopping the towing bar's vertical motion. Of course arresting cable 44 can be further shortened so that it will arrest the tow bar at any position below the maximum displacement, as may be desired.

Having thus described the fundamental novel features of the invention as applied to a specific embodiment, it is to be understood that various changes may be made in the form of the device illustrated by those skilled in the art without departing from the spirit thereof.

I claim:

1. A tow bar arresting device comprising in combination a shift control linkage assembly and arresting means, said linkage assembly being connected to a power take-off unit, said arresting means being connected to said tow bar, the automatic actuation of said arresting means by vertical displacement of said tow bar resulting in disengagement of said tow bar from said power take-off unit to which said shift control linkage assembly is connected, said tow bar being connected to said power take-off unit by means of a winch drive, said winch drive causing said vertical displacement in association with drive means, and wherein said shift control linkage assembly comprises a shift link shaft, a control bar and an arresting bar integrally joined, wherein said shift link shaft courses through the center of said control bar, said shift link shaft also coursing through an end of said arresting bar, a shift control shaft being connected to said arresting bar at one end thereof and to said power take-off unit at the other end thereof, said arresting means being connected to both said tow bar and arresting bar at opposite ends thereof, said shift control shaft and power take-off unit having a winch drive associated respectively therewith, said winch drive powering a winch cable causing said vertical displacement of said tow bar, whereby the vertical displacement of said tow bar results in the outward displacement of said arresting bar thereby disengaging said winch drive from said power take-off unit.

2. A device according to claim 1, wherein said winch drive is disengaged from actuation by said power take-off unit by said automatic actuation of said arresting means.

3. A device according to claim 1, wherein said arresting means comprises an arresting cable connected at one end to said tow bar adjacent a pivotal end of said tow bar, said arresting cable passing through opening means connecting with said arresting bar, and the other end of said arresting cable being secured to said arresting bar.

4. A device according to claim 1, wherein said control bar has oppositely disposed manual controlling means secured thereto.

5. A tow bar arresting device comprising in combination a shift control linkage assembly and arresting means, said linkage assembly being connected to a power take-off unit, said arresting means being connected to said tow bar, the automatic actuation of said arresting means by vertical displacement of said tow bar resulting in disengagement of said tow bar from said power take-off unit to which said shift control linkage assembly is connected, said tow bar being connected to said power take-off unit by means of a winch drive, said winch drive causing said vertical displacement in association with drive means, and wherein said shift control linkage assembly comprises a shift link shaft, a control bar and an arresting bar integrally joined, and further wherein said shift link shaft courses through the center of said control bar, said shift link shaft also coursing through an end of said arresting bar, a shift control shaft being connected to said arresting bar at one end thereof and to said power take-off unit at the other end thereof, said arresting means being connected to both said tow bar and arresting bar at opposite ends thereof, said shift control shaft and power take-off unit having a winch drive associated respectively therewith, said winch drive powering a winch cable causing said vertical displacement of said tow bar, whereby the vertical displacement of said tow bar results in the outward displacement of said arresting bar thereby disengaging said winch drive from said power take-off unit.

References Cited

UNITED STATES PATENTS

| | | |
|---|---|---|
| 1,443,376 | 1/1923 | Morgan et al. |
| 2,393,312 | 1/1946 | Davenport. |
| 2,436,000 | 2/1948 | Fleming. |
| 3,094,221 | 6/1963 | Galuska. |

ALBERT J. MAKAY, *Primary Examiner.*

U.S. Cl. X.R.

212—39